United States Patent [19]

Huynh et al.

[11] Patent Number: 5,255,330
[45] Date of Patent: Oct. 19, 1993

[54] IMAGE ACQUISITION SAMPLE CLOCK PHASE CONTROL EMPLOYING HISTOGRAM ANALYSIS

[75] Inventors: Tu-Chuong Huynh, Manalapan; Byung H. Lee, Holmdel, both of N.J.

[73] Assignee: AT&T Bell Laboratories, Murray Hill, N.J.

[21] Appl. No.: 592,396

[22] Filed: Oct. 3, 1990

[51] Int. Cl.$^5$ .............................................. G06K 9/66
[52] U.S. Cl. ......................................... 382/18; 382/51; 358/445
[58] Field of Search ............... 358/445, 465, 466, 467, 358/148, 149; 382/18, 51; 307/262

[56] References Cited

U.S. PATENT DOCUMENTS

| | | | |
|---|---|---|---|
| 4,122,487 | 10/1978 | Beaulier et al. | 358/13 |
| 4,408,232 | 10/1983 | Itoh | 358/445 |
| 5,038,381 | 8/1991 | Nelson | 382/18 |
| 5,045,951 | 9/1991 | Kimura et al. | 358/445 |
| 5,144,566 | 9/1992 | Anderson et al. | 382/18 |

Primary Examiner—Michael T. Razavi
Assistant Examiner—Steven P. Klocinski
Attorney, Agent, or Firm—Frederick B. Luludis

[57] ABSTRACT

A facility is provided which determines the optimum phase of a sample clock signal that is used to acquire a copy of an image containing text. In particular, the phase of the sample signal is set to an initial value and is thereafter incremented by a predetermined amount of time following the acquistion of each of a predetermined number of copies of the image, in which each such copy is defined by respective pixel values. Upon acquiring a current copy of the image, a histogram is formed from ones of the pixel values and is stored in memory in place of a priorly stored histogram if the latest histogram contains more pixel values indicative of text than the priorly stored histogram. The phase of the sample clock signal is then adjusted to the phase associated with the histogram that is stored in memory following the last of such acquisitions.

9 Claims, 4 Drawing Sheets

IMAGE ACQUISITION SAMPLE CLOCK PHASE CONTROL EMPLOYING HISTOGRAM ANALYSIS

FIELD OF THE INVENTION

The invention relates to image acquisition systems and more particularly relates to controlling the phase of a sample clock signal that is used to digitally sample signals defining a particular image.

BACKGROUND OF THE INVENTION

In video signal processing and acquisition systems, a so-called "frame grabber" is typically used to acquire a copy of an image characterized by video signals generated by an image scanner for delivery to a display device, such as a raster scan display. Such video signals typically include signals defining text. To acquire a copy of the video signals, the frame grabber, using a sample clock signal that is phase synchronized with a horizontal sync signal that is outputted by the image scanner, digitally samples each of the video signals. In this way, the frame grabber generates pixel elements (pixels) each having a so-called grey scale value indicative of the level of a respective one of the sampled video signals.

In a monochrome system, video signals representing text typically define black or white, whereas video signals representing an image other than text may define black, white or different shades of grey. To ensure that the values of pixels obtained as a result of sampling video text signals define text, rather than some other image, then, the phase of the sampling clock signal needs to be synchronized with the steady state period of such video text signals. However, such synchronization is difficult to achieve simply and inexpensively using only the horizontal sync signal. In fact, when the phase of the sample clock signal is synchronized solely with horizontal sync signal, then it is likely that such video text signals will be sampled during their transition times, thereby resulting in pixel values defining respective shades of gray.

SUMMARY OF THE INVENTION

The foregoing problem is dealt with and advance in the art of image acquisition is achieved, in accordance with the invention, by (a) sampling such video signals over a number of frames such that the phase of the sampling clock is started at a known point and then increased by a predetermined amount at the beginning of each such frame, (b) storing in memory the result of a histogram of the current frame of acquired pixels if that result proves to be better than the result of a histogram associated with a prior frame of acquired pixels, and (c) selecting as the desired phase for the sampling clock signal the phase whose associated histogram result is stored in memory at the end of the last sampling frame. In accordance with an aspect of the invention, a phase index associated with the desired phase is stored in a file associated with the image scanner which is generating the video signals. In this way, when the invention is employed in a system which acquires images from different image scanners, the phase index associated with the image scanner currently on line may be unloaded from the associated file and used to immediately set the sample clock to the desired phase.

GENERAL DESCRIPTION

Figure 1:
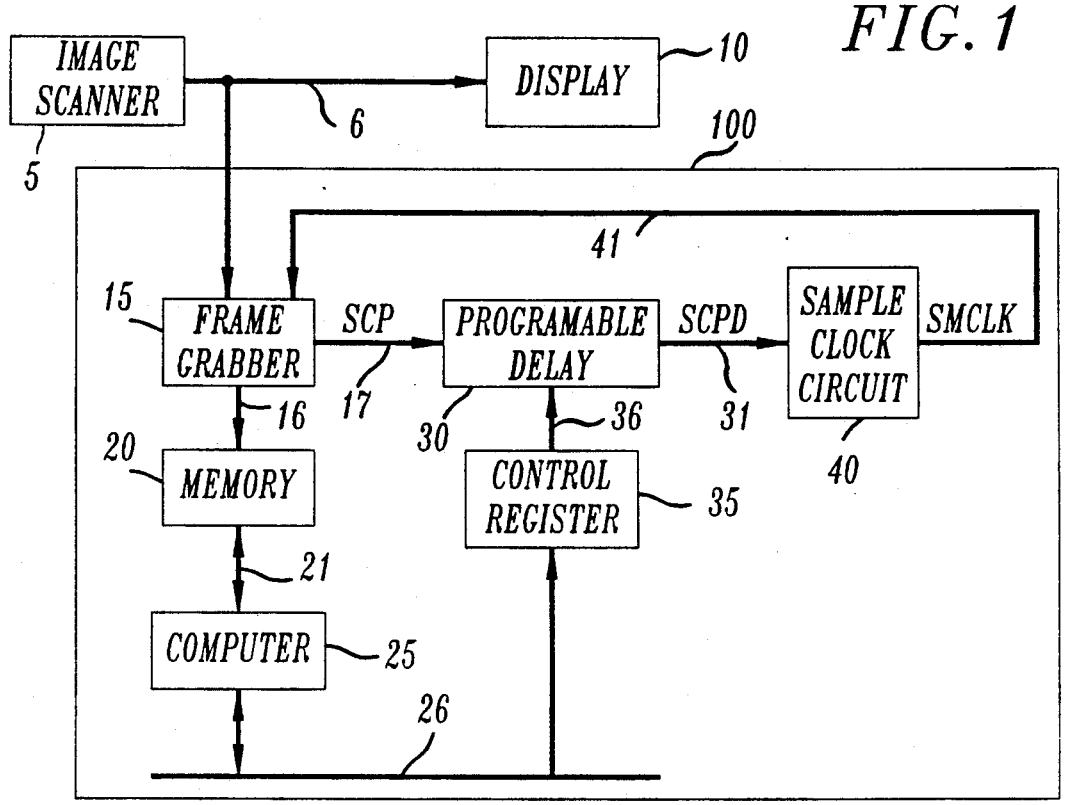
FIG. 1 is a broad block diagram of an image acquisition system in which the invention is illustratively implemented.

Image acquisition system 100 depicted in FIG. 1 operates to acquire a copy of an image that is generated by image scanner 5 for delivery to display 10 via communication path 6. System 100 includes frame grabber circuit 15, memory 20, computer 25, programmable delay circuit 30, control register 35 and sample clock generator 40.

In particular, image scanner 5, which may be, for example, the General Electric, Inc. computerized tomography scanner (CT), model CT9800, outputs to path 6 for display on display 10 video signals defining an image including text. Such signals are also received at one input to frame grabber 15, which converts the video signals into digital picture elements (pixels) and stores then in memory 20 via bus 16. The operation of a frame grabber circuit is well-known to the art and will not be discussed herein. However, it suffices to say that a frame grabber circuit typically includes a number of components, for example, a video amplifier, sync separator, dc restorer, video buffer and analog-to-digital converter, which cooperate with one another to obtain a digital copy of the signals that image scanner 5 outputs to path 6.

In addition, frame grabber 15 employs a sampling clock signal supplied by sample clock circuit 40 via lead 41 to sample a signal appearing on path 6. In an illustrative embodiment of the invention, sample clock circuit 40 may be, for example, the sample clock circuit disclosed in U.S. Pat. No. 4,757,264 issued Jul. 12, 1988 to B. H. Lee et al, which is hereby incorporated by reference. The phase of the sample clock signal (SMCLK) appearing on lead 41 is typically controlled by a horizontal sync signal that imager 5 outputs to path 6 and which, heretofore, was supplied directly to sample clock circuit 40 via frame grabber 15 and lead 17.

It is well-known in the art, that a so-called grey scale is used to define the intensity of a pixel value. It is also well-known in the art, that a grey scale is typically characterized by a predetermined number binary bits—illustratively eight bits, in which the binary values of 000 and 255 define black and white, respectively. It can be appreciated then that text may be displayed on a display in a particular manner, for example, as white characters on a black background. It can also be appreciated that a pixel having a value between 000 and 255 defines a particular shade of grey.

Figure 2:
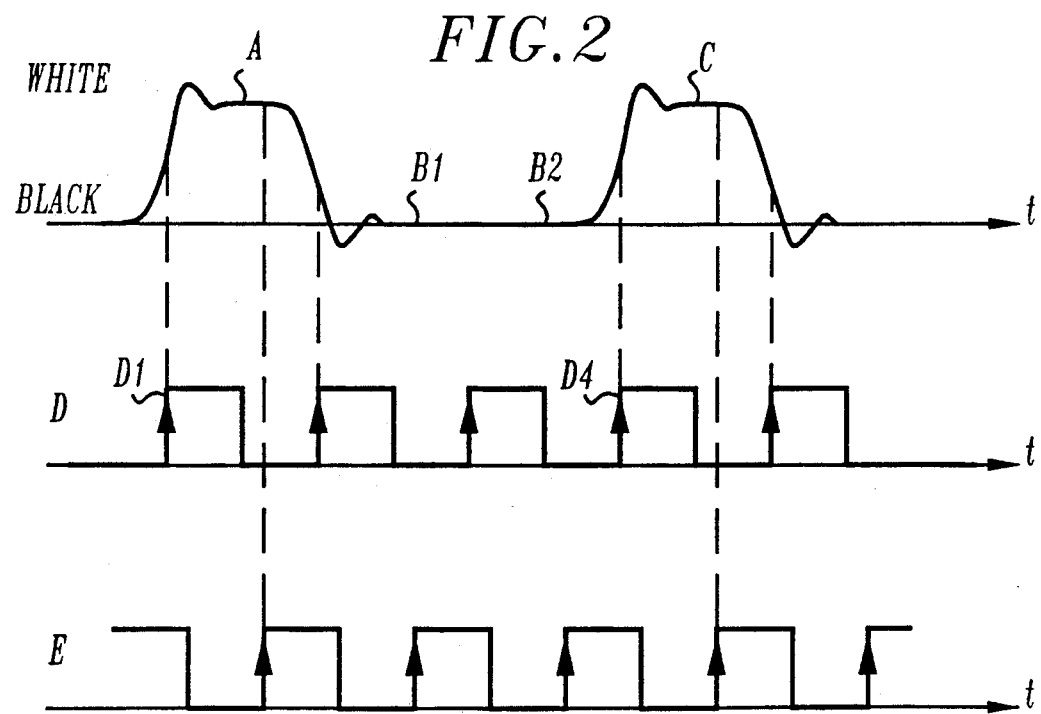
FIG. 2 illustrates video text signals and a number of sample clock signals and is useful for discussing the aforementioned problem.

We have found, however, that such sample clock signals need to be in almost precise phase synchronization with the steady state values of the imager 5 video text signals to obtain an accurate copy of those signals. What this means is that if a text signal is not sampled at its optimum sampling point, then the value of the resulting pixel could define a particular shade of grey, rather than either black or white. This problem is illustrated in FIG. 2, which depicts a series of video signals representing text signals, in which a first level—illustratively zero—defines the color black and in which a second level—illustratively one—defines the color white. It is seen from the FIG. that signals A and C represent white, and signals B1 and B2 represent black.

A problem occurs as a result of attempting to phase synchronize the sample clock signals with such video signals using only the corresponding horizontal sync signal. In such an instance, the phase, i.e., leading edge, of the resulting sample clock signal may not be phase synchronized with the "steady state" value of the video signal being sampled, as shown for sampling clock signals D. For example, the leading, or sampling, edge of sample clock D1, which is used to sample video signal A, occurs before the latter signal reaches a steady state value. Consequently, video signal A would be sampled along its leading transition edge, thereby resulting in a sample signal having a pixel value defining a shade of grey, rather than white. The same problem holds for sample clock signal D4, whose leading edge also occurs before video signal C reaches its steady state value.

We deal with this problem simply and inexpensively by successively increasing the phase of the sample clock signal by a predetermined amount of time—illustratively two nanoseconds—until that signal is optimally positioned for sampling text video signals appearing on path 6. The desired effect of shifting the sample clock signal is shown in connection with the sample clock signals designated E in FIG. 2, in which the sample clock signals are phase shifted so that the leading edge of each sample clock signal is positioned to optimally sample a respective video signal. The desired result is achieved by supplying the horizontal sync signal to programmable delay circuit 30, as shown in FIG. 1, rather than sample clock circuit 40, as was priorly done. Programmable delay circuit 30, in turn shifts the phase of the horizontal sync signal by an amount of time determined by computer 25 operating through control register 35. Programmable delay circuit 30 then supplies the result to sample clock circuit 40 via SCPD lead 31.

Specifically, image scanner 5 outputs to path 6 successive frames of image signals of the image being scanned in which each frame of video signals is essentially a duplicate of a preceding frame of such signals. As mentioned above, frame grabber 15 is adapted to "grab" a copy of a frame of such signals using the sample clock signal that it receives via lead 41, and store the acquired samples in memory 20 via bus 16. Initially, for the first image that frame grabber 15 acquires, programmable delay circuit 30 is set to shift the phase of the horizontal sync signal by a predetermined amount of time, e.g., zero time. That is, for the first frame of samples that frame grabber 15 acquires, programmable delay circuit 30 is not programmed to delay the phase of the horizontal sync signal before supplying the latter signal to sample clock circuit 40.

In addition, computer 25, under the control of a software program which implements the invention in computer 25, generates a histogram of the image signals stored in memory 20 and stores the histogram as well as an index indicative of the value of the delay that is programmed into programmable delay circuit 30 in memory 20. Computer 25 then increments, by the aforementioned predetermined value, i.e., two nanoseconds, the amount of delay that is programmed into programmable delay circuit 30. Computer 10 does this by setting, via bus 26, particular register circuits contained in circuit 35 to a predetermined logic state. In an illustrative embodiment of the invention, register control circuit 35 may be, for example, the SN74LS174N integrated circuit available from Texas Instruments Incorporated.

As is well-known, scanner 5 outputs to path 6 a composite of the horizontal sync and vertical trace signals. Scanner 5 does this to mark the beginning of the next frame of video signals. Accordingly, frame grabber 15 acquires a copy of the composite and separates the horizontal and vertical sync signals from one another and supplies the former signal to programmable delay circuit 30 via lead 17. Programmable delay circuit 30, shifts (delays) the phase the horizontal sync signal by the amount of time programmed by computer 25, i.e., two nanoseconds, and supplies the resulting signal to circuit 40 via lead 31.

Accordingly, circuit 40 now outputs to lead 41 connected to frame grabber 15 a sample clock signal which is shifted in time by two nanoseconds. Using that clock signal, frame grabber 15 acquires another copy of the video signals that scanner 5 outputs to path 6. Similarly, frame grabber 15 stores the resulting pixels in memory 20.

Once again, computer 25 generates a histogram of the new frame of pixels that frame grabber 15 has stored in memory 20 and compares the results of the current histogram with the results of the histogram priorly stored in memory 20. If the comparison indicates that the current histogram contains more pixels having values closer to either the black or white pixel values than the priorly stored histogram, then computer 25 stores in memory 20, at the location containing the results of the prior histogram, the results of the current histogram and its associated delay index. Otherwise, computer 25 discards the results of the current histogram.

Following the foregoing, computer 25 operating through control register 25 reprograms programmable delay circuit 30 to increment, by the aforementioned predetermined amount, the amount of delay already programmed in the latter circuit. Thus, at this point, circuit 30 would be programmed to shift (delay) the phase of the horizontal sync by four nanoseconds, thereby causing sample clock circuit 40 to output to lead 41 a sample clock signal that is shifted in time by four nanoseconds. Using the current version of the sample clock signal, frame grabber 15 acquires another copy of the video signals that scanner 5 outputs to path 6 and stores the resulting pixel values as they are generated in memory 20, in the manner described above.

Similarly, computer 25 again generates a histogram of the current pixel values stored in memory 20. As before, computer 25 compares the results of the current histogram with the results of the histogram priorly stored in memory 20. As mentioned above, if the comparison indicates that the current histogram contains more pixels having values equal or closer to either the black or white pixel values than the histogram priorly stored in memory 20, then computer 25 stores in memory 20, at the location containing the results of the prior histogram, the results of the current histogram and its associated delay index. Otherwise, computer 25 discards the results of the current histogram.

Image acquisition 100 continues in the foregoing manner, i.e., incrementing the delay programmed in programmable delay circuit 30 and comparing the results of the current histogram with the results of the priorly stored histogram, until the delay programmed into circuit 30 reaches a predetermined value (discussed below). At that point, memory 20 would have stored therein the histogram having the most pixels populating grey scale values equal or closer to either the black or white pixel values than any other histogram generated by computer 25 during the current scanning session. Accordingly, computer 25, then, unloads from memory 20 the delay index associated with the histogram that is stored in memory 20 and reprograms programmable delay circuit 30 in accordance with latter index, thereby inserting in circuit 30 the optimum delay value for shifting the phase of the sample clock signal generated by circuit 40 to position the latter signal for optimal sampling of each video text signal that scanner 5 outputs to path 6, in accord with the invention.

Figure 3:
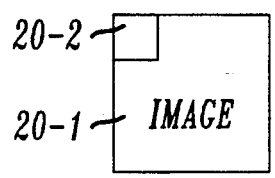
FIG. 3 is a block diagram representing a frame of pixels and illustrates the manner in which a block, or window, of text pixels within the frame may be selected to compute a respective histogram.

To reduce computation and processing time, computer 25 generates a histogram, in accordance with an aspect of the invention, using a block, or window, of pixel values, rather than a full frame of such values, as depicted in FIG. 3. In particular, FIG. 3 represents a frame of pixels defining text and/or an image other than text. Typically, if the image that scanner 5 scans contains text, then such text resides at the top, or beginning of the frame, such as frame 20-1. In addition, we have found that a histogram generated over a block, or window, of such text pixels, such as window 20-2, substantially equals a histogram generated over all of the text pixels. Accordingly, the computation and processing time required of computer 25 to generate a histogram is enhanced by using just a window of text pixels, rather than all of the text pixels.

Figure 4:
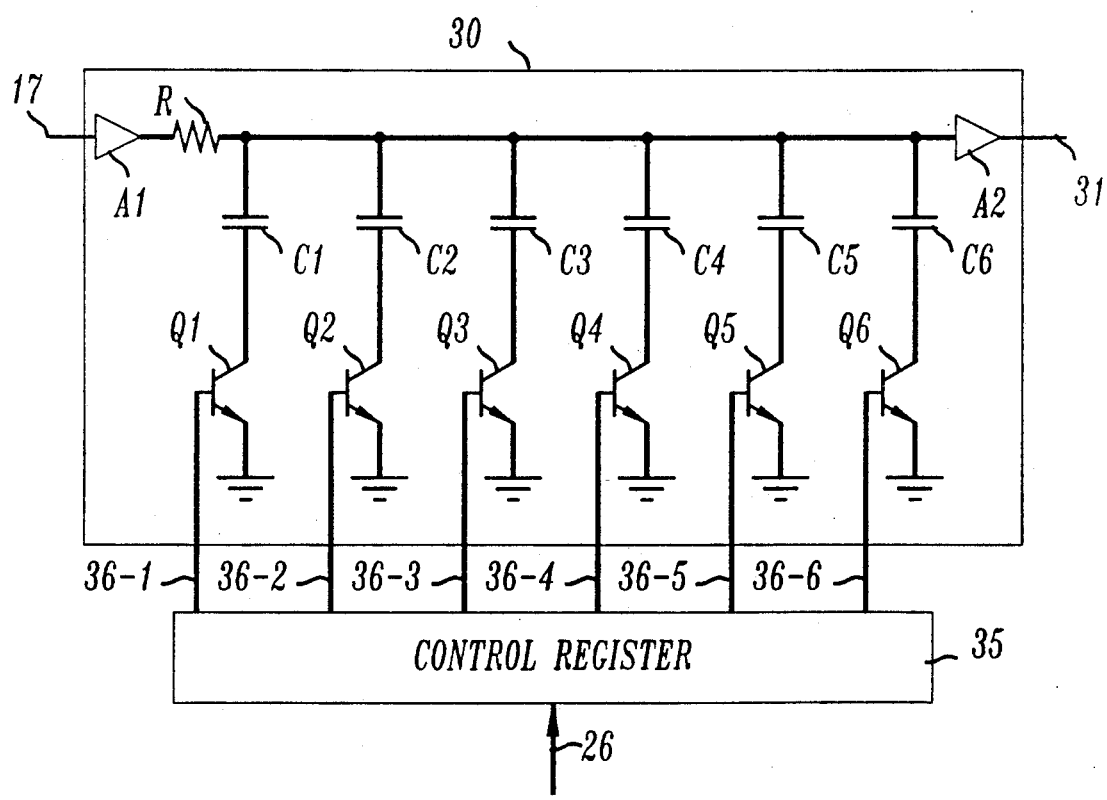
FIG. 4 is a detailed block diagram of the programmable delay circuit of FIG. 1.

Turning now to FIG. 4, there is shown a detailed block diagram of programmable delay circuit 30, which includes amplifiers A1 and A2 for isolating an integrator circuit formed from resistor R and capacitors C1 through C6 from leads 17 and 31, i.e., the input and output of circuit 30. In an illustrative embodiment of the invention, the capacitance of capacitor C2 is substantially twice that of capacitor C1, the capacitance of capacitor C3 is substantially twice that of capacitor C2, and so on. It is seen from the FIG., that one terminal of each of the capacitors C1 through C6 may be extended to ground potential via a respective one of transistors Q1 through Q6 that is switched to a conducting state, i.e., is "turned on". A capacitor so grounded forms the aforementioned intergrator circuit with resistor R.

Computer 25 controls, through control register circuit 35, the operation of individual ones of the transistors Q1 through Q6. Accordingly, computer 25 may program the intergration time, and thus delay the horizontal sync signal as it is transported from lead 17 to lead 31 via the integrator circuit. Computer 25 does this by directing control register 35 to place on respective ones of the leads 36-1 through 36-6 of bus 36 an appropriate first bias voltage level, which causes respective ones of transistors Q1 through Q6 to switch to the conducting state. For example, if computer 25 sends to control register 35 a value of 63, then control register 35 places on each of the leads 36-1 through 36-6 the first voltage level, thereby causing all of the transistors Q1 through Q6 to switch to the conducting state. As such, the effective capacitance value of capacitors C1 through C6 would be 63 times the value of the capacitance of capacitor C1. In that instance, then, the delay provided by circuit 30 would be 126 nanoseconds (63×2.0 nanoseconds). If, on the other hand, computer 25 sends to control register 35 via bus 26 a value of 00, then control register 35 places on each of the leads 36-1 through 36-6 a second, opposite bias voltage level, e.g., 0 volts (i.e., ground potential), which causes all of the transistors to switch to a nonconducting state. In that instance, then, the delay provided by circuit 30 is zero. As a further example, if computer 25 sends to register 35 an intermediate value, e.g., a value 03, then control register 35 would cause transistors Q1 and Q2 to switch to the conducting state and switch transistors Q3 through Q6 to the nonconducting state. In this instance, the value of the delay provided by circuit would be 6 nanoseconds.

Thus, computer 25 operating via control register 35 may successively increment by a value of—illustratively 2.0 nanoseconds—the delay provided by circuit 30.

It is clear of course that computer 25 does not have to use all of the delay values that may be programmed into circuit 30 to determine the optimum phase for the sample clock signal. For example, if it is assumed that the period of a video signal appearing on path 6 is 32 nanoseconds, then computer 25 only needs to increment programmable delay circuit 30 sixteen times (16×2.0 nanoseconds=32 nanoseconds), in which each such increment occurs following the acquisition of a copy of the image and equals a unit delay of 2.0 nanoseconds.

Figure 5:
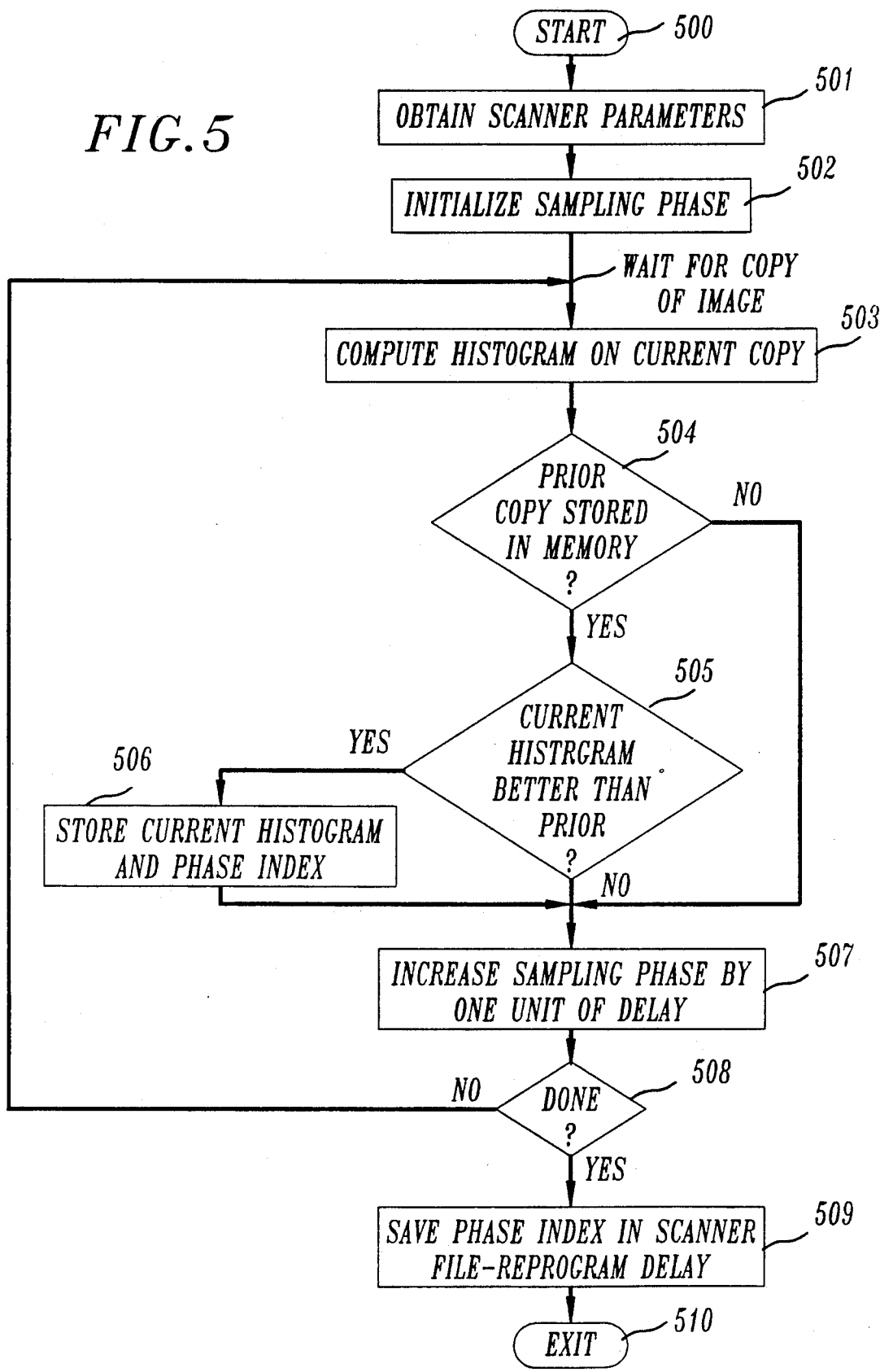
FIG. 5 is a flowchart of an illustrative software program which implements the invention in the computer of FIG. 1.

Turning now to FIG. 5, there is shown in flow chart form the software program which implements the invention in computer 25, and in which the program is stored in memory associated with computer 25, such as RAM memory 20.

In particular, the program when it is entered at block 500 proceeds to block 501 where it unloads from a file stored in memory 20 particular parameters associated with scanner 5. One such parameter is the frequency (f) of the video signal that scanner 5 outputs to path 6. Armed with that information, the program calculates in a straightforward manner (i.e., 1/f/2, where 2 represents the 2 nanosecond delay increment) the number of successive increments that need to be programmed into programmable delay circuit 30 to determine the optimum phase delay for the sample clock signal. The program stores that number in memory and then proceeds to block 502, where it initializes programmable delay circuit 30 to an initial value of delay, e.g., a phase delay of zero. The program then waits an amount of time slightly longer than the amount of time frame grabber 15 needs to acquire a copy of the video signals appearing on path 6 and store the resulting pixel values in memory 20.

Thereafter, the program proceeds to block 503 where it computes a histogram over the window of the current copy of the pixel values stored in memory 20. In an illustrative embodiment of the invention, such a window comprises—illustratively the first 100 pixels of the first 100 rows of the current copy of the image. Following that task, the program proceeds to block 504 where it checks to see if a prior histogram of the current image is stored in memory 20. The program proceeds to block 507 if that is not the case. Otherwise, the program proceeds to block 505 where it compares the results of the current histogram with the results of the prior histogram stored in memory 20.

Figure 6:
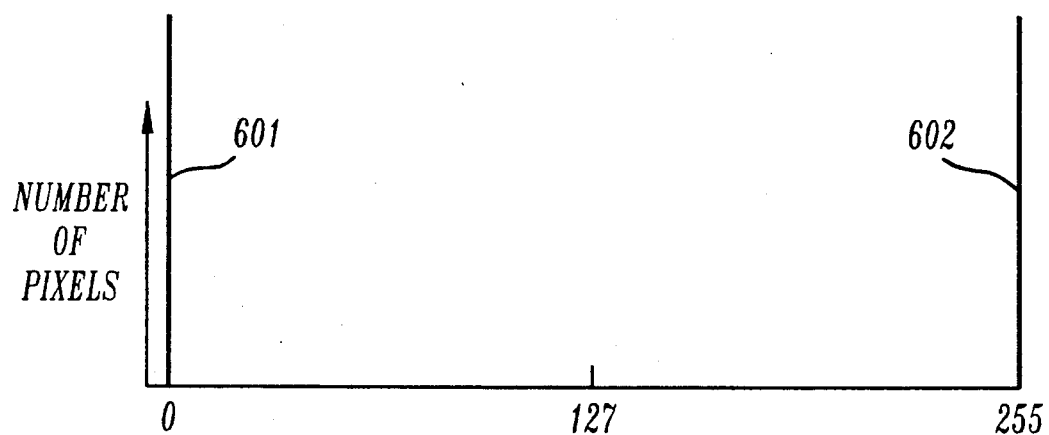
FIGS. 6 and 7 each depict a histogram in generalized form.
Figure 7:
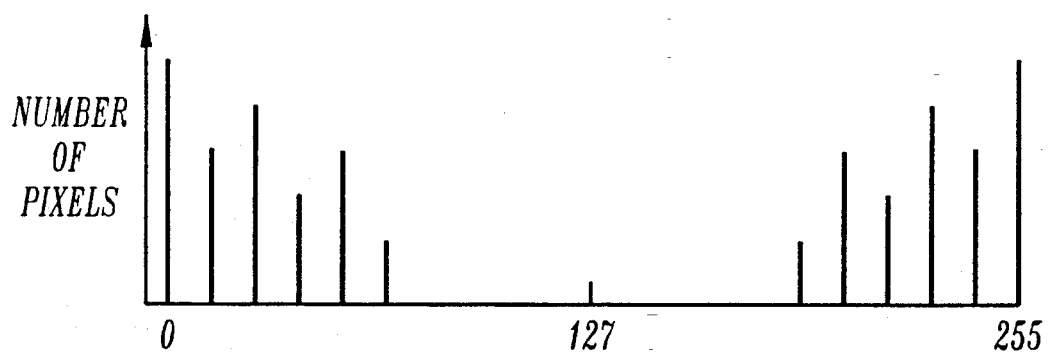

As an aside, the action of generating and comparing such histograms will hopefully lead to determining the optimum phase delay for the sample clock signal. In the ideal case, all of the text pixels acquired via path 6 will populate opposite ends of the histogram grey scale. This case is depicted in FIG. 6, which shows, in generalized form, that the grey scale value of each of the acquired text pixels either defines black 601 or white 602. FIG. 6 assumes an eight bit grey scale, which means that the grey scale values of black and white will be zero and 255, respectively. However, such results are not obtained when the phase of the sample clock signal is not set at the optimum point. What this means is that an appreciable number (or all) of the acquired text pixels will have grey scale values between black and white, an example of which is shown in FIG. 7.

Returning to FIG. 5, the comparison performed at block 505 takes advantage of the symmetry of a histogram about the center of the grey scale, which is assumed herein to be, for example, the grey scale value of 127. Thus, the comparison may involve either pixels values between zero and 127 or between 127 and 255. The comparison is also based on a number of criteria. For example, (1) the histogram having the most pixels with a value close to 255 will be considered to be the best, and therefore will be stored in memory 20; (2) if the grey scale value of 255 of both the stored histogram and the current histogram is populated with text pixels, then the histogram having the most text pixels of that value is stored in memory 20; (3) if the stored and current histogram have the same number of pixels of value 255, then the histogram having the least pixel population within the grey scale range of 127 through 254 is stored in memory; and (4) if all three of the foregoing criteria is found to be true for both the stored and current histograms, then, as a default mechanism, the program stores in memory 20 the current histogram, as shown at block 506.

Following the foregoing task, the program proceeds to block 507 where it increases the phase of the sample clock signal by incrementing, in the manner described above, the delay that is programmed into programmable delay circuit 30. The program then proceeds to block 508 where it checks to see if it is done. That is, the program maintains in associated memory a counter to track the number of times that delay circuit 30 has been incremented during the current session, and compares the value in the counter with the value calculated at block 501. If the value of the counter exceeds the value calculated at block 501, then the programs proceeds to block 509. Otherwise, the program increments the counter and returns to block 503 to await the next of copy of the image.

At block 509, the program unloads from memory 20 the stored phase index and stores a copy of that index in the file associated with scanner 5. In addition, the program reprograms programmable delay circuit in accordance with the value of the index. The program then exits via block 510.

The foregoing is merely illustrative of the principles of our invention. Those skilled in the art will be able to devise numerous arrangements, which, although not explicitly shown or described herein, nevertheless embody those principles that are within the spirit and scope of the invention.

We claim:

1. Apparatus for adjusting the phase of a sampling signal having an initial phase, said sampling signal being used to digitally sample external signals forming individual frames of signals, said apparatus comprising
   a memory,
   means for sampling a predetermined number of said frames of external signals and for storing the results obtained from sampling each of said frames in said memory, wherein individual ones of said external signals of each of said frames define text when they are displayed on a display,
   means, operative following the sampling of each of said predetermined number of frames of external signals, for incrementing the phase of said sampling signal by a predetermined amount of time, and
   means, operative following the sampling of the last of said predetermined number of frames, for adjusting the phase of said sampling signal to the phase that was used to obtain that frame of stored results that is most indicative of said text.

2. The apparatus set forth in claim 1 wherein said means for incrementing is a computer and said predetermined amount of time is derived as a function of said computer programming a programmable delay circuit operative for shifting the phase of said sampling signal as a function of said programming.

3. The apparatus set forth in claim 1 wherein said stored sampled results are respective pixel values and wherein said means for incrementing includes means for forming from a current frame of pixel values a histogram, for comparing said histogram with a histogram stored in said memory and formed from pixel values associated with a preceding one of said frames and for storing in said memory that one of the compared histograms containing the most pixel values indicative of said text.

4. The apparatus set forth in claim 3 wherein said means for adjusting includes means for identifying said frame of sampled results that is the most indicative of said text as a function of the histogram that is stored in said memory following said last one of said frames.

5. The apparatus set forth in claim 3 wherein said current histogram is formed from a predetermined block of pixel values of said current frame of pixel values.

6. Apparatus for generating a sampling signal that is used to sample external signals, said external signals forming respective frames of external signals and individual ones of said external signals of each of said frames define text when they are displayed on a display, said apparatus comprising
   a memory,
   means for sampling a predetermined number of frames of said external signals and for storing in said memory an index associated with the results obtained from sampling a first frame of said external signals,
   means, operative following the sampling of each of said predetermined number of frames of external signals, for incrementing by a predetermined amount of time the phase of said sampling signal, and for replacing said stored index with an index associated with the current frame of sampled results if said current frame of sampled results is more indicative of said text than the frame of sampled results associated with said stored index, and
   means for adjusting the phase of said sampling signal to the phase used to obtain the sampled results associated with the index that is stored in said memory following the sampling of the last of said predetermined number of frames of external signals.

7. The apparatus set forth in claim 6 wherein said means for incrementing is a computer and said predetermined amount of time is derived as a function of said computer programming a programmable delay circuit operative for shifting the phase of said sampling signal as a function of said programming.

8. The apparatus set forth in claim 6 wherein said index is a histogram.

9. A method of adjusting the phase of a sampling signal to an optimum phase so that an accurate copy of external signals may be acquired, said external signals occurring as repetitive frames of external signals and individual ones of said external signals define text when they are displayed on a display, said method comprising the steps of sampling a predetermined number of frames of said external signals and storing in a memory an index associated with the results obtained from sampling a first frame of said external signals, incrementing, following the sampling of said predetermined number of frames of external signals, the phase of said sampling signal by a predetermined amount of time, and replacing the stored index with an index associated with a current frame of sampled results if the current frame of sampled results is more indicative of said text than the frame of sampled results associated with the stored index, and identifying as the optimum phase the phase that was used to obtain the sampled results associated with the index that is stored in said memory following the sampling of the last of said predetermined number of frames of external signals.

* * * * *